US008762572B2

(12) United States Patent  (10) Patent No.: US 8,762,572 B2
Seki  (45) Date of Patent: Jun. 24, 2014

(54) COMMUNICATION DEVICE

(75) Inventor: Takao Seki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 145 days.

(21) Appl. No.: 13/052,906

(22) Filed: Mar. 21, 2011

(65) Prior Publication Data

US 2011/0238798 A1  Sep. 29, 2011

(30) Foreign Application Priority Data

Mar. 25, 2010  (JP) ................................. 2010-069387

(51) Int. Cl.
*G06F 15/173* (2006.01)
(52) U.S. Cl.
USPC .......................................... 709/245; 709/223
(58) Field of Classification Search
CPC ................................................ H04L 29/12216
USPC ................... 709/220, 203, 221, 245; 370/389
See application file for complete search history.

(56) References Cited

U.S. PATENT DOCUMENTS

| | | | | |
|---|---|---|---|---|
| 6,636,242 | B2 * | 10/2003 | Bowman-Amuah | 715/764 |
| 6,684,243 | B1 * | 1/2004 | Euget et al. | 709/222 |
| 6,920,494 | B2 * | 7/2005 | Heitman et al. | 709/223 |
| 7,287,063 | B2 * | 10/2007 | Baldwin et al. | 709/216 |
| 7,370,093 | B2 * | 5/2008 | Ohara | 709/220 |
| 7,734,745 | B2 * | 6/2010 | Gloe | 709/223 |
| 7,778,229 | B2 * | 8/2010 | Denny et al. | 370/338 |
| 7,860,961 | B1 * | 12/2010 | Finkelstein et al. | 709/223 |
| 7,945,649 | B2 * | 5/2011 | Sakai | 709/221 |

(Continued)

FOREIGN PATENT DOCUMENTS

| | | |
|---|---|---|
| JP | 2003-283497 A | 10/2003 |
| JP | 2005-252578 A | 9/2005 |
| JP | 2006-295532 A | 10/2006 |
| JP | 2009-165041 A | 7/2009 |

OTHER PUBLICATIONS

Hewlett Packard Development Co., Ltd, How to Assign Static IP Address to Printer, HP Customer Care—HP Deskjet 5850 Printer, 2010.

(Continued)

*Primary Examiner* — Kevin Bates
*Assistant Examiner* — Clarence D McCray
(74) *Attorney, Agent, or Firm* — Merchant & Gould P.C.

(57) ABSTRACT

A communication device including a registration unit that registers an IP address of the communication device and a method information including a first method information indicating a first setting method for setting a dynamic IP address and a second method information indicating a second setting method for setting a static IP address. The registration unit includes a change unit that changes registered contents of a memory in accordance with a user's instruction. When the first method information and a first IP address are registered in the memory, the change unit does not change the method information in the memory from the first method information to the second method information when a method change instruction for changing the first setting method to the second setting method is given under a state where the first IP address has not been changed to another IP address.

14 Claims, 4 Drawing Sheets

(56) References Cited

U.S. PATENT DOCUMENTS

| | | | |
|---|---|---|---|
| 8,060,587 B2* | 11/2011 | Ahmad et al. | 709/223 |
| 8,250,238 B2* | 8/2012 | Takahashi | 709/245 |
| 2002/0112076 A1* | 8/2002 | Rueda et al. | 709/245 |
| 2003/0177220 A1 | 9/2003 | Ohara | |
| 2004/0133689 A1* | 7/2004 | Vasisht | 709/228 |
| 2005/0129240 A1* | 6/2005 | Balfanz et al. | 380/270 |
| 2006/0056408 A1* | 3/2006 | Cho | 370/389 |
| 2006/0092134 A1* | 5/2006 | Ohara | 345/161 |
| 2009/0177786 A1 | 7/2009 | Takahashi | |

OTHER PUBLICATIONS

Japan Patent Office, Notification of Reasons for Refusal for Japanese Patent Application No. 2012-156880 (counterpart to above-captioned patent application), mailed Jul. 9, 2013.

"Secret Skill of Windows Network Management to Learn by Specific Examples Part 1 No Work is Realized by "Intension" to Understand! Carefully Selected Basic Techniques Best 9 for Perfectly Gaining Control of Windows Network", Windows Server World, vol. 110, No. 6, Jun. 1, 2005, pp. 62-76.

Hayao Yokogaki, "VMware Workstation 3.2 (2) Setting for Conveniently Using Guest OS", Unix Magazine, vol. 18, No. 4, Apr. 1, 2003, pp. 27-52.

* cited by examiner

COMMUNICATION DEVICE

CROSS-REFERENCE TO RELATED APPLICATIONS

This application claims priority from Japanese Patent Application No. 2010-069387 filed on Mar. 25, 2010, the entire subject matter of which is incorporated herein by reference.

TECHNICAL FIELD

The present invention relates to a communication device, more specifically to a communication device that allows a user to select an IP address setting method.

BACKGROUND

For example, there has been proposed a related-art printer that allows a user to select an IP address setting method. That is, the user can select any one of an automatic setting method for setting a dynamic IP address that is automatically allocated by a DHCP (Dynamic Host Configuration Protocol) server in a printer and a manual setting method for setting a static IP address that is manually designated by the user. Further, there has also been discloses a user operation manual for changing the IP address setting method of the printer from the automatic setting method to the manual setting method.

SUMMARY

Illustrative aspects of the present invention provide a technique for suppressing the occurrence of a phenomenon in which the execution of the appropriate communication becomes difficult due to the change of the IP address setting method of the communication device.

DETAILED DESCRIPTION

<General Overview>

In the related-art technique, in a case where the IP address setting method of a printer is an automatic setting method, the IP address setting method of the printer can be changed to a manual setting method even if a specified IP address that is currently set in the printer, that is, a specified IP address allocated from a DHCP server, is not changed to another IP address. In this case, the printer maintains the specified IP address that is the dynamic IP address allocated from the DHCP server as a static IP address, unless there is a user instruction for changing the IP address. On the other hand, in accordance with a request from another device, the DHCP server has a possibility of allocating the same IP address as the specified IP address to the other device. Due to this, according to the related-art technique, a plurality of devices (the printer and the other device), to which the same IP address has been set, may exist in the same LAN. In this case, it may be difficult to execute appropriate communication in the LAN.

Accordingly, illustrative aspects of the present invention provides a technique for suppressing the occurrence of a phenomenon in which the execution of the appropriate communication becomes difficult due to the change of the IP address setting method of the communication device (in the above-described example, the printer).

According to a first aspect of the invention, there is provided a communication device comprising: a memory; a registration unit that registers method information indicating an IP address setting method of the communication device and an IP address of the communication device in the memory, wherein the method information is any one of plural kinds of method information including: a first kind of method information that indicates a first kind of setting method for setting a dynamic IP address automatically allocated to the communication device as the IP address of the communication device; and a second kind of method information that indicates a second kind of setting method for setting a static IP address manually designated by a user as the IP address of the communication device; and a communication execution unit that performs communication using the IP address registered in the memory, wherein the registration unit includes a change unit that changes registered contents of the memory in accordance with an instruction of the user, and wherein when the first kind of method information and a first IP address are registered in the memory, the change unit does not change the method information in the memory from the first kind of method information to the second kind of method information in a first case where a method change instruction for changing the first kind of setting method to the second kind of setting method is given by the user under a state where the first IP address has not been changed to another IP address.

According thereto, the communication device does not change the method information stored in the memory from the first kind of method information to the second kind of method information in the first case (in the case where the method change instruction is given by the user in a state where the first IP address is not changed to the other IP address when the first kind of method information and the first IP address are registered in the memory). That is, in the first case, the communication device does not change the IP address setting method of the communication device from the first kind of setting method to the second kind of setting method. Accordingly, in a state where the first IP address that is the dynamic IP address is set in the communication device as the static IP address, the allocation of the same IP address as the first IP address to the other device can be prevented. Due to this, the occurrence of circumstances in which the communication device (or another device other than the above) is unable to execute appropriate communication can be suppressed.

According to a second aspect of the invention, in the communication device, the registration unit further includes a display control unit that displays on a display unit a message indicating that the change from the first kind of setting method to the second kind of setting method is not recommended in the first case.

According thereto, it can be understood that the user is not recommended to change the setting method from the first kind of setting method to the second kind of setting method.

According to a third aspect of the invention, in the communication device, wherein the change unit includes a determination unit that determines whether the first IP address registered in the memory coincides with a second IP address newly designated by the user, and wherein if it is determined that the first IP address coincides with the second IP address, the change unit determines that the first IP address has not been changed to the other IP address.

According thereto, it can be appropriately determined whether the first IP address has been changed to the other IP address.

According to a fourth aspect of the invention, in the communication device, wherein the registration unit further includes a display control unit that displays a screen for allowing the user to change the registered contents of the memory on the display unit, and wherein the display control unit is configured to: display a first screen for displaying the first kind of setting method and the first IP address on the display unit when the first kind of method information and the first IP address are registered in the memory; and display a second screen for displaying the second kind of setting method, from which at least a portion of values in a value string that indicates the first IP address is erased, on the display unit when a display change instruction for changing the display for displaying the first kind of setting method to the display for displaying the second kind of setting method is given by the user through the first screen.

According thereto, by viewing the first screen, the user can know the IP address setting method and the first IP address that are currently registered in the communication device, and thus the user can perform the operation for changing the registered contents of the memory with reference thereto. Also, in the case where the above-described display change instruction is given, the second screen, in which at least a portion of the values in a value string that indicates the first IP address is erased, is displayed, and thus the possibility that the user will newly designate the first IP address and the other IP address is increased.

According to a fifth aspect of the invention, in the communication device, wherein the second screen does not include a value for indicating a host portion of the first IP address, but the second screen includes a value for indicating a network address portion of the first IP address.

According thereto, the possibility is increased, in which the user designates the same value as the value that indicates the network address portion of the first IP address as the value of the network address portion of the new IP address and designates the value different from the value that indicates the host portion of the first IP address as the value of the host portion of the new IP address.

According to a sixth aspect of the invention, in the communication device, wherein when the first kind of method information and the first IP address are registered in the memory, the change unit changes the method information in the memory from the first kind of method information to the second kind of method information in a second case where a method change instruction for changing the first kind of setting method to the second kind of setting method is given by the user under a state where the first IP address has been changed to another IP address.

According thereto, in a state where the first IP address has been changed to the other IP address, the communication device can change the IP address setting method of the communication device from the first kind of setting method to the second kind of setting method in accordance with the method change instruction from the user.

A control method for realizing the above communication device, a computer program and a non-transitory computer-readable medium for storing the corresponding computer program are novel and useful.

EXEMPLARY EMBODIMENTS

Exemplary embodiments of the present invention will be described with reference to the drawings.

First Exemplary Embodiment

System Configuration

Figure 1:
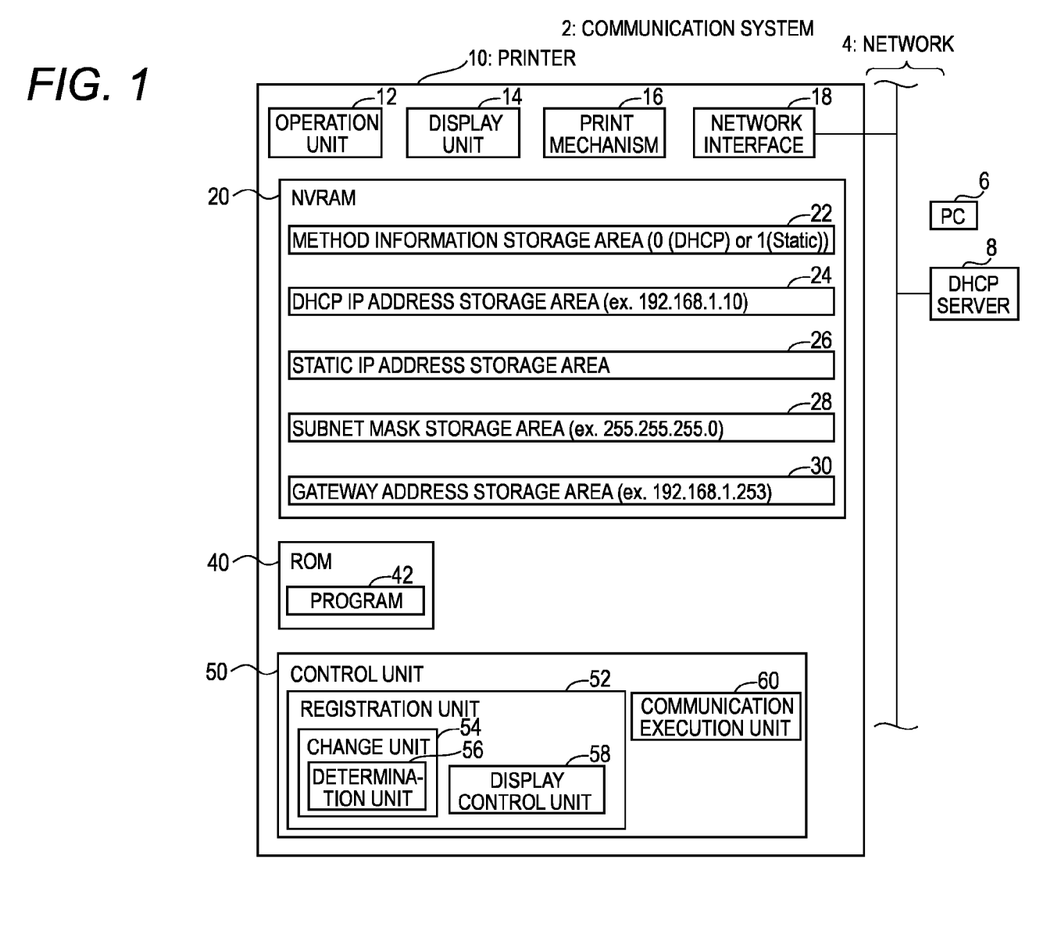
FIG. 1 is a diagram illustrating the configuration of a communication system according to an exemplary embodiment of the present invention.

Referring to the drawings, a first exemplary embodiment according to an exemplary embodiment of the invention will be described. As illustrated in FIG. 1, a communication system 2 includes a printer 10, a PC 6 and a DHCP server 8. The respective devices 6, 8 and 10 are connected to a network 4 such as LAN or the like. The respective devices 6, 8 and 10 are communicable with one another through the network 4.

(Configuration of Printer 10)

The configuration of the printer 10 will be described in detail. The printer 10 includes an operation unit 12, a display unit 14, a print mechanism 16, a network interface 18, an NVRAM (Nonvolatile memory) 20, a ROM 40 and a control unit 50. The operation unit 12 includes a plurality of keys. The user can input diverse instructions to the printer 10 by operating the operation unit 12. The display unit 14 is a display for displaying diverse information. The print mechanism 16 is a print mechanism of an ink jet type, laser type, or the like. The network interface 18 is connected to the network 4. The NVRAM 20 includes a plurality of storage areas 22 to 30. The ROM 40 stores a program 42 for the control unit 50 to execute diverse processes. The control unit 50 performs the processes according to the program 42 to realize respective functions of a registration unit 52 and a communication execution unit 60. The registration unit 52 includes a change unit 54 and a display control unit 58. The change unit 54 includes a determination unit 56.

Then, information stored in the respective storage areas 22 to 30 included in the NVRAM 20 will be described. The method information storage area 22 stores the method information that indicates the IP address setting method of the printer 10. In this exemplary embodiment of the present invention, setting methods (1) and (2) as below exist as the IP address setting method of the printer 10. (1) A setting method for setting a dynamic IP address that is automatically allocated by the DHCP server 8 in the printer 10 (hereinafter called a "DHCP setting method"). (2) a setting method for setting a static IP address that is manually set by the user in the printer 10 (hereinafter called a "static setting method"). The method information that indicates the DHCP setting method is "0", and the method information that indicates the static setting method is "1". The method information storage area 22 stores either "0 (DHCP)" or "1 (Static)".

The DHCP IP address storage area 24 stores the IP address allocated to the printer 10 by the DHCP server 8 (for example, "192.168.1.10"). The state where the "0 (DHCP)" is stored (registered) in the method information storage area 22 and the IP address is stored (registered) in the DHCP IP address storage area 24 is a state where the IP address allocated by the DHCP server 8 is set as the IP address of the printer 10. In this state, whenever the IP address is allocated to the printer 10 from the DHCP server 8, the IP address is stored in the DHCP IP address storage area 24. That is, whenever the IP address is allocated to the printer 10 from the DHCP server 8, the IP address of the printer 10 can be updated.

The static IP address storage area 26 stores the IP address manually designated by the user. The state where "1 (Static)" is stored (registered) in the method information storage area 22 and the IP address is stored (registered) in the static IP address storage area 26 is the state where the IP address manually designated by the user is set as the IP address of the printer 10. In this state, the storage contents of the static IP address storage area 26 are maintained unless an operation that changes the IP address (an operation determined as YES in S18 of FIG. 2 to be described later) is executed by the user. That is, unless an operation that changes the IP address is executed by the user, the IP address of the printer 10 is not changed.

The subnet mask storage area 28 stores a subnet mask (for example, "255.255.255.0") that is used in the network 4. In a state where the IP address allocated by the DHCP server 8 is set as the IP address of the printer 10, the subnet mask storage area 28 stores the subnet mask acquired from the DHCP server 8. In a state where the IP address manually designated by the user is set as the IP address of the printer 10, the subnet mask storage area 28 stores the subnet mask manually designated by the user.

The gateway address storage area 30 stores a gateway address (for example, "192.168.1.253") that is used in the network 4. In a state where the IP address allocated by the DHCP server 8 is set as the IP address of the printer 10, the gateway address storage area 30 stores the gateway address acquired from the DHCP server 8.

In a state where the IP address manually designated by the user is set as the IP address of the printer 10, the gateway address storage area 30 stores the gateway address manually designated by the user.

(Function of PC 6)

In the PC 6, diverse known applications (for example, document editing software such as word processor software, table calculation software, and the like) are installed. Also, in the PC 6, a printer driver for the printer 10 is installed. The PC 6 converts data generated by the application into print data using the printer driver. Then, the PC 6 acquires the IP address of the printer 10 (for example, from a DNS (Domain Name System) server), sets the acquired IP address of the printer 10 as a transmitter side IP address, and transmits the print data.

(Function of DHCP Server 8)

The DHCP server 8 allocates an IP address to a specified device (for example, the PC 6 or the printer 10) in accordance with a request from the corresponding specified device that is connected to the network 4. The IP address range that can be allocated by the DHCP server 8 is predetermined. In accordance with the request for IP address allocation from the specified device, the DHCP server 8 selects one IP address in the IP address range and allocates (transmits) the IP address to the specified device. Accordingly, the specified device acquires the IP address from the DHCP server 8, and sets the IP address as its own IP address. Usually, the IP address allocated by the DHCP server 8 has a determined validity term, and the specified device requests the allocation of a new IP address from the DHCP server 8 when the validity term determined with respect to the IP address of the specified device expires. Accordingly, the DHCP server 8 allocates a new IP address to the specified device. At this time, with respect to the IP address allocated to the specified device, of which the validity term does not expire, the DHCP server 8 does not allocate the same IP address to another IP address. However, with respect to the IP address allocated to the specified device, of which the validity term expires, the DHCP server 8 can allocate the same IP address to another IP address.

(Communication Process Executed by Printer 10)

Next, diverse processes executed by the control unit 50 of the printer 10 will be described. First, the contents of the communication process executed by the communication execution unit 60 will be described. As described above, the PC 6 sets the IP address of the printer 10 as the transmitter side IP address when transmitting the print data. When the print data is received, the communication execution unit 60 transmits a confirmation packet that indicates that the print data has been received to the PC 6. In this case, the communication execution unit 60 sets the IP address of the printer 10 registered in the NVRAM 20 (in the case where the method information is "0", it is the IP address registered in the DHCP storage area 24, while in the case where the method information is "1", it is the IP address registered in the static storage area 26) as the transmitter side IP address. That is, the communication execution unit 60 transmits the confirmation packet using the IP address of the printer 10 that is registered in the NVRAM 20. At this time, the control unit 50 of the printer 10, if the print data is received, drives the print mechanism 16 using the print data. Accordingly, an image that is indicated by the print data is printed on a print medium.

In addition to the process of transmitting the confirmation packet as described above, the communication execution unit 60 can perform diverse communication processes using the IP address of the printer 10 that is registered in the NVRAM 20. For example, the communication execution unit 60 sends a packet that indicates its status (standby state, printing state, or the like) to the PC 6 as a reply in accordance with a status request packet from the PC 6. At this time, the communication execution unit 60 sets the IP address of the printer 10 that is registered in the NVRAM 20 as the transmitter side IP address.

At this time, in a state where the IP address allocated by the DHCP server 8 has been set as the IP address of the printer 10, the communication execution unit 60 monitors the elapse of the validity term of the current IP address of the printer 10 (IP address stored in the DHCP IP address storage area 24). If the validity term expires, the communication execution unit 60 requests the allocation of a new IP address from the DHCP server 8. The DHCP server 8, in accordance with the request from the printer 10, supplies a new IP address, the subnet mask that is used in the network 4, and the gateway address that is used in the network 4 to the printer 10. In this case, the registration unit 52 stores (registers) the new IP address, the subnet mask and the gateway address in the DHCP IP address storage area 24, the subnet mask storage area 28 and the gateway address storage area 30.

(Registered Contents Change Process Executed by Printer 10)

Next, with reference to FIG. 2, the registered contents change process executed by the control unit 50 will be described. Hereinafter, the DHCP setting method and the static setting method may be simply called "DHCP" and "static", respectively. If a user desires to change the registered contents of the NVRAM 20, the user performs a predetermined operation with respect to the operation unit 12. In this case, the display control unit 58 generates set screen data for displaying the set screen and supplies the set screen data to the display unit 14 (S10). Accordingly, as illustrated in FIG. 3A, a set screen 70a is displayed on the display unit 14.

The set screen 70a includes a setting method display area 72, an IP address display area 76, a subnet mask display area 78, a gateway address display area 80, an OK button 82 and a cancel button 84. In the setting method display area 72, a character string ("DHCP" or "static") for displaying the current IP address setting method of the printer 10 is displayed. The display control unit 58 reads the method information ("0 (DHCP)" or "1 (static)") that is stored in the method information storage area 22 and generates set screen data so that the character string ("DHCP" or "static") displayed by the method information is displayed in the setting method display area 72.

In the IP address display area 76, the current IP address of the printer 10 is displayed. In the case where "0 (DHCP)" is stored in the method information storage area 22, the display control unit 58 reads the IP address value string that is stored in the DHCP IP address storage area 24 and generates set screen data so that the value string is displayed in the IP address display area 76. Also, in the case where "1 (static)" is stored in the method information storage area 22, the display control unit 58 reads the IP address value string that is stored in the static IP address storage area 26 and generates set screen data so that the value string is displayed in the IP address display area 76. In this case, the IP address "value string" means a character string composed of a plurality of numerical values that indicate the IP address (for example, "192.168.1.10").

In the subnet mask display area 78 and the gateway address display area 80, the current subnet mask of the printer 10 and the current gateway address of the printer 10 are displayed, respectively. The display control unit 58 reads the respective value strings stored in the subnet mask storage area 28 and the gateway address storage area 30 and generates the set screen data. Then, the display control unit 58 displays the respective value strings in the subnet mask display area 78 and the gateway address display area 80, respectively.

By viewing the set screen 70a, a user can know the current IP address setting method of the printer 10, the current IP address, the current subnet mask and the current gateway address. The user can apply diverse operations to the operation method 12 through the set screen 70a. The display control unit 58 monitors whether the operation is executed by the user (S12). Here, in the case of "YES", the processing proceeds to S14.

The user can execute the operation for selecting a button 74 in the set screen 70a in a state where "DHCP" is displayed in the setting method display area 72. In this case, the display control unit 58 determines "YES" in S14 of FIG. 2 and displays a new set screen on the display unit 14 (S16). FIG. 3B illustrates an example of a new set screen 70b displayed in S16. In the new set screen 70b, "static" is displayed in the setting method display area 72 instead of "DHCP". In the new set screen 70b, the display contents of other display areas 76 to 80 and the respective buttons 82 and 84 are the same as those in the set screen 70a. That is, for example, in the IP address display area 76, the whole value string for displaying the current IP address of the printer 10 is displayed in the same manner as described above. In this case, the process in S16 is realized in a manner such that the display control unit 58 generates new set screen data for displaying a new set screen 70b and supplies the new set screen data to the display unit 14. This method is performed in the same manner as the process in S20 and S24 to be described later. When the S16 is ended, the display control unit 58 returns to S12 to monitor the user's operation.

Also, the user can execute the operation for selecting the IP address display area 76 in a state where the set screens 70a and 70b and other set screens (for example, set screens in which the display of the subnet mask from the set screen 70a has been changed) are displayed. Then, the user can designate a new IP address by operating ten keys (numeral keys) included in the operation unit 12. In this case, the display control unit 58 determines "YES" in S18 illustrated in FIG. 2 and displays a new set screen on the display unit 14 (S20). FIG. 3C illustrates an example of a new set screen 70c that is displayed in S20 when the display control unit 58 determines "YES" in S18 in a state where the set screen 70b of FIG. 3B is displayed. In the new set screen 70c, the new IP address designated by the user is displayed in the IP address display area 76. In this example, the new IP address ("192.168.1.110") designated by the user is different from the current IP address ("192.168.1.10" (FIGS. 3A and 3B)) of the printer 10. If the S20 is ended, the display control unit 58 returns to S12 and monitors the user's operation.

The user may select an OK button 82 for giving a final instruction for changing the registered contents of the NVRAM 20 in a state where the set screens 70a to 70c or other set screens are displayed. In this case, the display control unit 58 determines "YES" in S22 and proceeds to S30. At this time, if an operation, except for the respective operations that are determined as "YES" in steps S14, S18 and S22, is executed through the operation unit 12, the display control unit 58 determines "NO" in S22 and proceeds to S24. For example, the user may execute an operation for selecting the subnet mask display area 78 or the gateway address display area 80 and then may execute an operation for designating a new subnet mask or gateway address. In this case, in S24, the display control unit 58 makes the new set screen, which is displayed in the subnet mask display area 78 or the gateway address display area 80 through the new subnet mask or gateway address designated by the user, be displayed on the display unit 14. Also, for example, the user can execute an operation for selecting a button 74 in a state where "static" is displayed in the setting method display area 72. In this case, in S24, the display control unit 58 makes the new set screen, in which "DHCP" is displayed in the setting method display area 72, be displayed on the display unit 14. If the S24 is ended, the display control unit 58 returns to S12 and monitors the user's operation. In the case where an operation for selecting a cancel button 84 is executed, the control unit 50 does not change the registered contents of the NVRAM 20 and terminates the registered contents change process.

In S30 that is executed when an operation for selecting the OK button 82 is executed, the change unit 54 determines whether the change operation from "DHCP" to "static" has been executed. That is, the change unit 54 determines whether an operation that is determined as "YES" in S14 has been executed. In the case of "YES" in S30, the change unit 54 proceeds to S32, while in the case of "NO", the change unit 54 proceeds to S36. In this case, even if the change operation from "DHCP" to "static" has been executed, the change unit 54 may determine "NO" in S30. For example, in a state where "1 (static)" is stored in the method information storage area 22, "static" is displayed in the set screen that is displayed in S10. In this state, there is a possibility that a user will execute a change operation from "static" to "DHCP" (first selection operation of button 74) and then execute a change operation from DHCP to static (second selection operations of button 74). In this case, the user's final instruction does not intend to cause a change from "DHCP" to "static", but intends to maintain the static state. Accordingly, the change unit 54 determines "NO" in S30 even though the change operation from "DHCP" to "static" has been executed in a state where "1 (static)" is stored in the method information storage area 22.

In S32, the determination unit 56 determines whether the IP address that is stored in the DHCP IP address storage area 24 coincides with the IP address that is displayed on the IP address display area 76 of the set screen when an operation for selecting the OK button 82 on the set screen is executed. That is, the determination unit 56 determines whether the current IP address (IP address allocated by the DHCP server 8) of the printer 10 coincides with the IP address newly designated by the user. For example, in the case where an operation for selecting the OK button 82 is executed on the set screen of FIG. 3C that is displayed through FIGS. 3A and 3B, the current IP address "192.168.1.10" of the printer 10 does not coincide with the IP address "192.168.1.110" that is displayed on the set screen of FIG. 3C. In this case, the determination unit 56 determines "NO" in S32 and proceeds to S36.

Figure 2:
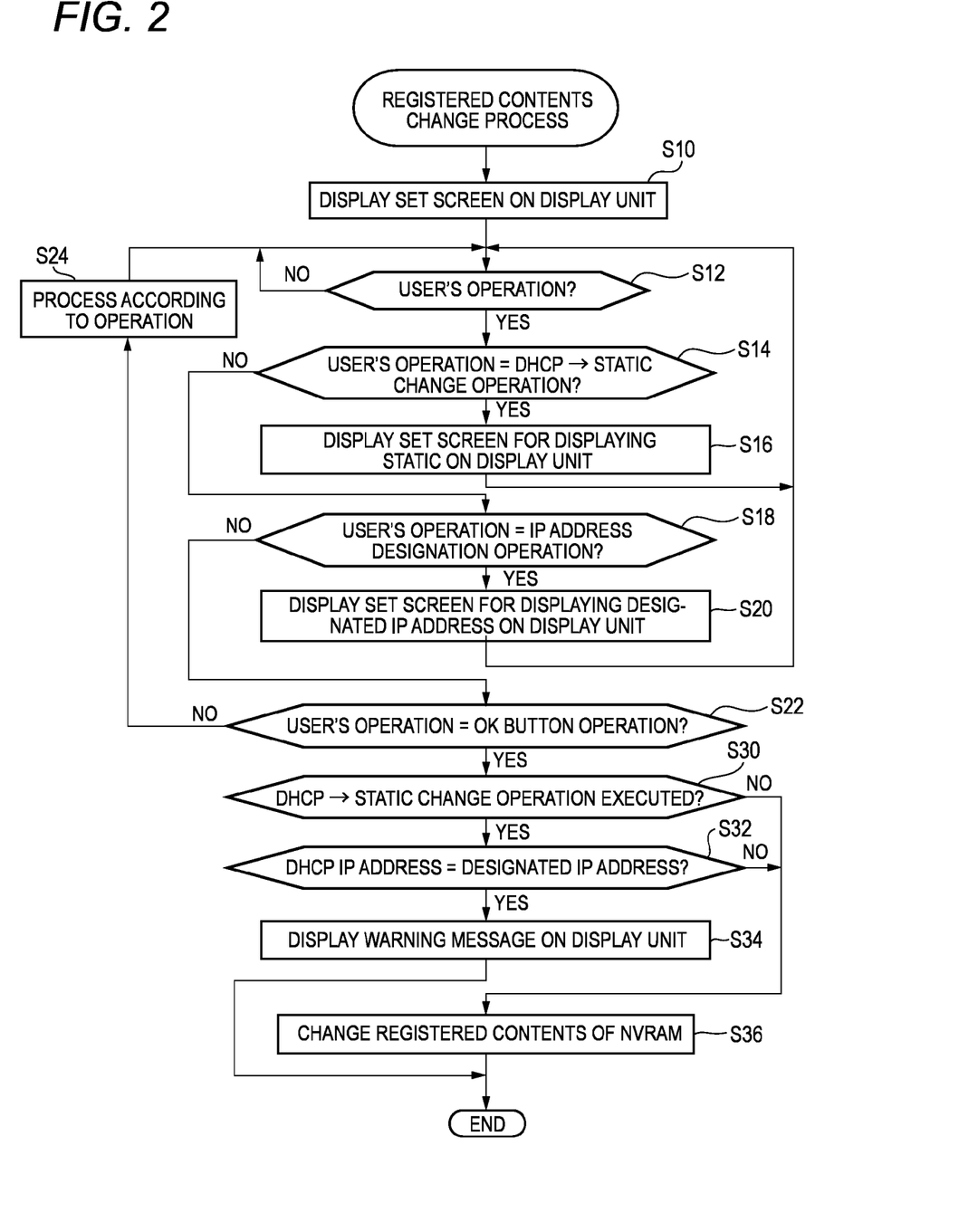
FIG. 2 is a flowchart of a registered contents change process.
Figure 3A:
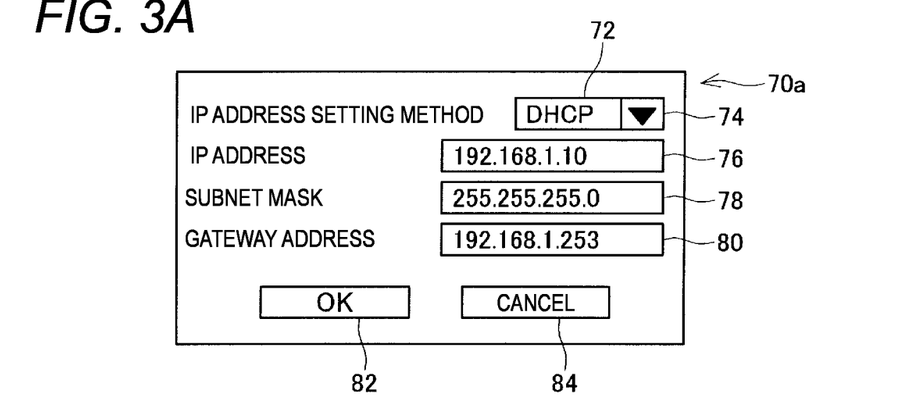
FIGS. 3A to 3C are diagrams illustrating respective displayed screens according to a first exemplary embodiment of the present invention.
Figure 3B:
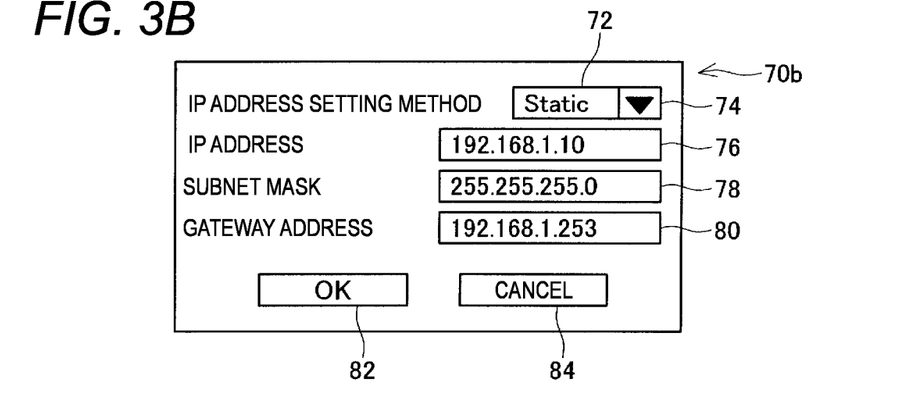
Figure 4:
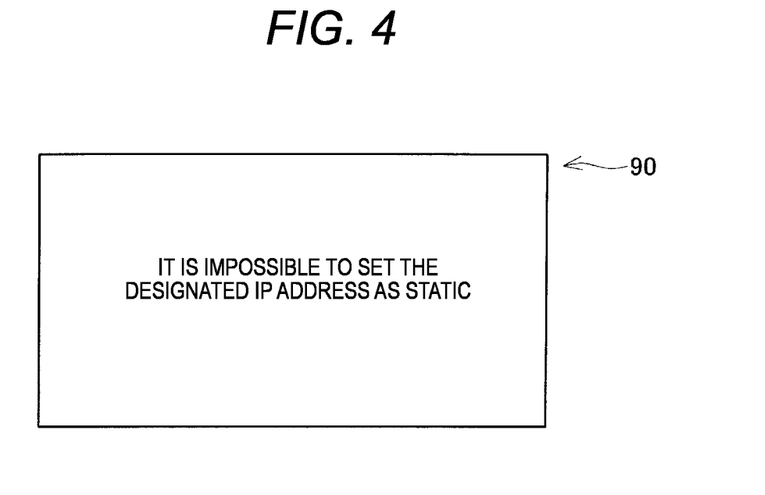
FIG. 4 is a diagram illustrating a screen including a warning message.

However, in the case where an operation for selecting the OK button 82 is executed on the set screen of FIG. 3B that is displayed through FIG. 3A, the current IP address of the printer 10 coincides with the IP address that is displayed on the set screen of FIG. 3B. In this case, the determination unit 56 determines "YES" in S32. That is, the change unit 54 determines a state where the current IP address of the printer 10 has not been changed to another IP address. In this case, the display control unit 58 supplies warning screen data for displaying a warning screen that includes a warning message to the display unit 14 (S34). Accordingly, as illustrated in FIG. 4, a warning screen 90 is displayed on the display unit 14. The warning message indicates that the change from "DHCP" to "static" is not recommended. When the S34 is ended, the S36 is skipped, and the registered contents change process is ended. Accordingly, even if the change operation from "DHCP" to "static" is executed, the change unit 54 does not change the registered contents of the NVRAM 20. That is, the change unit 54 does not change "0 (DHCP)" that is stored in the method information storage area 22 to "1 (static)".

On the other hand, in S36, the change unit 54 changes the registered contents of the NVRAM 20. For example, in the case where "DHCP" is displayed on the setting method display area 72 when an operation for selecting the OK button 82 is executed on the set screen, the change unit 54 records "0 (DHCP)" in the method information storage area 22. In this case, when the operation for selecting the OK button 82 is executed on the set screen, the change unit 54 further records the value string, which indicates the IP address that is displayed on the IP address display area 76, in the DHCP IP address storage area 24. Also, for example, in the case where "static" is displayed on the setting method display area 72 when an operation for selecting the OK button 82 is executed on the set screen, the change unit 54 records "1 (static)" in the method information storage area 22. In this case, when the operation for selecting the OK button 82 is executed on the set screen, the change unit 54 further records the value string, which indicates the IP address that is displayed on the IP address display area 76, in the static IP address storage area 26. Through the above-described process, method information that indicates the DHCP or static setting method, "0" or "1", and the IP address of the printer 10 are registered in the NVRAM 20. Also, when the operation for selecting the OK button 82 is executed on the set screen, the change unit 54 records the value strings, which are displayed on the subnet mask display area 78 and the gateway address display area 80, in the subnet mask storage area 28 and the gateway address storage area 30. Accordingly, the subnet mask and the gateway address designated by the user are registered in the NVRAM 20.

At this time, in the case where the method information "0" that indicates the DHCP setting method is registered in S36, the respective information is registered in the respective storage areas 24, 28 and 30 in S36, but as described above, they are updated to the respective information acquired from the DHCP server 8. On the other hand, in the case where the method information "1" that indicates the static setting method is registered in S36, the respective information registered in the respective storage areas 26, 28 and 30 in S36 is maintained unless the registered contents change process of FIG. 2 is executed again.

A communication system 2 according to the first exemplary embodiment of the present invention has been described in detail. For example, if a configuration that executes the process in S36 is adopted in the case of "YES" in S32 of FIG. 2, "1 (static)" is stored in the method information storage area 22, and the IP address that is allocated to the printer 10 by the DHCP server 8 (IP address that is stored in the DHCP IP address storage area 24) is stored in the static IP address storage area 26. In this case, the registered contents change process of FIG. 2 is executed again, and the printer 10 maintains the dynamic IP address that is allocated by the DHCP server 8 as the static IP address unless a user executes an operation for designating another IP address (an operation that is determined as "YES" in S18). Further, if the validity term of the IP address that is maintained in the printer 10 (the IP address allocated to the printer 10 in the past) expires, there is a possibility that the DHCP server 8 will allocate the same IP address as the IP address to another device (for example, PC 6). That is, circumstances in which a plurality of devices, to which the same IP address is set (for example, the printer 10 and the PC 6), are connected to the same network 4 may occur. In this case, for example, the PC 6 is unable to transmit print data to the printer 10.

Figure 3C:
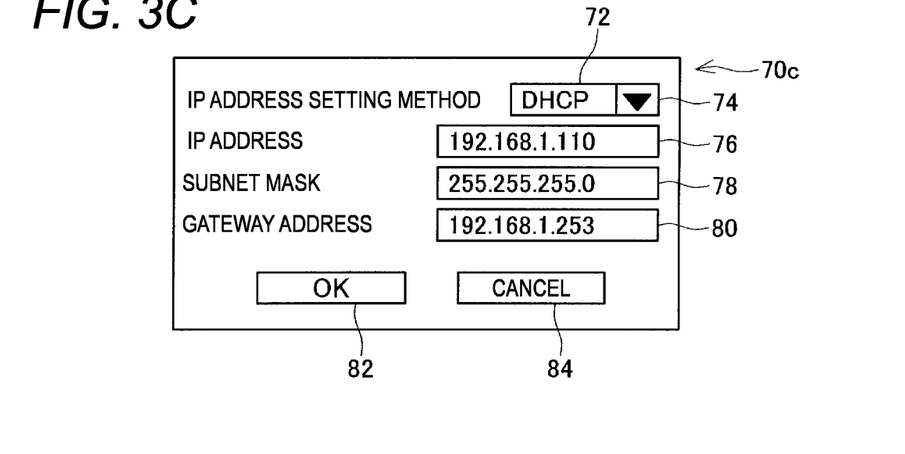

In order to prevent the occurrence of such circumstances in advance, in this exemplary embodiment, the printer 10 does not execute the process in S36 in the case of "YES" in S32 of FIG. 2. That is, even if a final instruction for changing the IP address setting method of the printer 10 from "DHCP" to "static" (the operation of the OK button 82 of FIG. 3) is given by the user in a state where the current IP address of the printer 10 is not changed to another IP address (see FIG. 3B) when the method information "0" that indicates the DHCP setting method is registered in the NVRAM 20, the printer 10 does not change the registered contents of the NVRAM 20. Accordingly, since the printer 10 maintains the dynamic IP address allocated by the DHCP server 8 as the dynamic IP address, the same IP address as the IP address is prevented from being allocated to another device (for example, the PC 6). Due to this, the occurrence of the circumstances, in which the printer 10 (further the PC 6) is unable to execute an appropriate communication (for example, print data communication), can be suppressed.

On the other hand, in the case of "NO" in S32 of FIG. 2, the printer 10 executes the process in S36. According to this configuration, the printer 10 can change the setting method of the printer 10 from "DHCP" to "static" in accordance with the user instruction.

Also, in the case of "YES" in S32 of FIG. 2, the printer 10 displays a warning message indicating that the change from "DHCP" to "static" is not recommended (see FIG. 4) on the display unit 14 (S34 in FIG. 2). According to this configuration, a user can recognize that the change from "DHCP" to "static" is not recommended.

Also, the printer 10 determines whether the current IP address of the printer 10 has been changed to another IP address by determining whether the current IP address of the printer 10 coincides with the IP address designated by the user in S32 of FIG. 2. According to this configuration, it can be appropriately determined whether the IP address of the printer 10 has been changed to another IP address.

Second Exemplary Embodiment

Next, a second exemplary embodiment of the present invention will be described. Here, points that are different from those in the first exemplary embodiment will be described. As described above, according to the first exemplary embodiment, the printer 10 changes the set screen 70*a* of FIG. 3A to the set screen 70*b* of FIG. 3B in the case of "YES" in S14 of FIG. 2. In the set screen 70*b* of FIG. 3B, the whole of the value string that indicates the current IP address of the printer 10 is displayed on the IP address display area 76.

Figure 5:
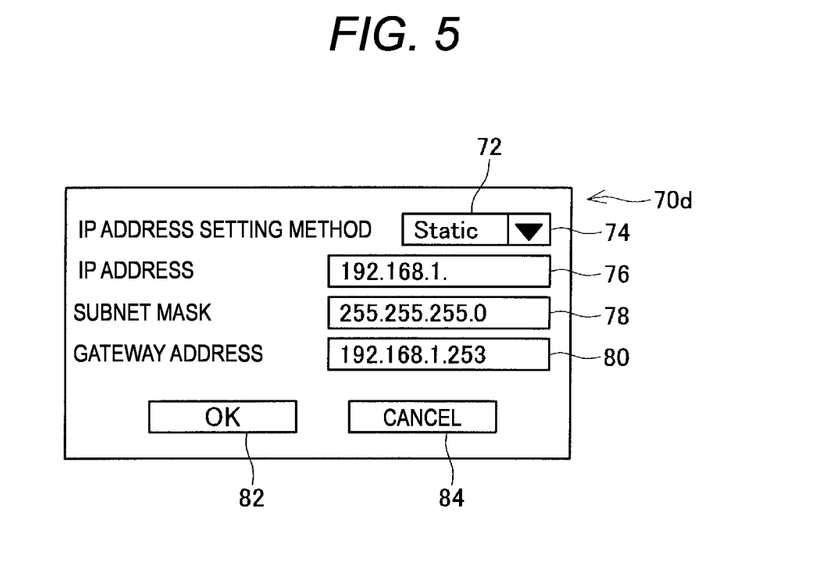
FIG. 5 is a diagram illustrating a screen according to a second exemplary embodiment of the present invention.

By contrast, in this exemplary embodiment, in the case of "YES" in S14 of FIG. 2, the display control unit 58 displays a new set screen, from which a portion of the value string that indicates the current IP address of the printer 10 (the IP address stored in the DHCP IP address storage area 24) is erased, on the display unit 14 (S16 in FIG. 2). FIG. 5 illustrates an example of the new set screen 70*d*. Specifically, on the IP address display area 76 of the new set screen 70*d*, an initial 24-bit value (for example, "192.168.1") that is the network address portion of the current IP address (for example, "192.168.1.10") of the printer 10 is displayed, but the last 8-bit value (for example, "10") that is the host portion of the current IP address of the printer 10 is not displayed. In this case, the network address portion is a portion that is masked by a subnet mask, and the host portion is a portion that is not masked by the subnet mask. For example, if the current subnet mask of the printer 10 is "255.255.255.0", the initial 24 bits of the current IP address of the printer 10 correspond to the network address portion, and the last 8 bits correspond to the host portion.

In the case of "YES" in S14 of FIG. 2, the display control unit 58 reads the subnet mask value stored in the subnet mask storage area 28 and specifies how many initial bits correspond to the network address portion. Then, the display control unit 58 generates new set screen data so that only the value that indicates the network address portion among the value string that indicates the current IP address of the printer 10 is displayed on the IP address display area 76. Accordingly, in comparison to the set screen 70*a*, the value that indicates the host portion is erased from the set screen 70*d*. That is, in the set screen 70*d*, the display area that corresponds to the host portion is blank. In this exemplary embodiment, like the set screen 70*d*, in a state where the IP address is not appropriately designated in the IP address display area 76 (that is, blank exists), the change unit 54 does not receive the operation for selecting the OK button 82. That is, unless the 32-bit value string is not displayed on the IP address display area 76, "YES" is not determined in S22 of FIG. 2.

According to the configuration in this exemplary embodiment, a user can recognize that it is necessary to newly designate the IP address when he/she sees the set screen 70*d*. Accordingly, the possibility that the user designates a new IP address can be heightened. Particularly, since only the value that indicates the network address portion among the current IP address of the printer 10 is displayed on the set screen 70*d*, the possibility that the user designates the same value as the value which indicates the network address that is used in the network 4 as the value of the network address portion of the new IP address can be heightened. Also, the possibility that the user designates the value that is different from the value that indicates the host portion of the current IP address of the printer 10 as the value of the host portion of the new IP address can be heightened.

The elements in the above-described exemplary embodiments and the corresponding relation ship between the elements will be described. The printer 10 is an example of the "communication device". "DHCP" and "static" are examples of the "first kind of setting method" and the "second kind of setting method", respectively. "0" and "1" which are stored in the method information storage area 22 are examples of the "first kind of method information" and the "second kind of method information", respectively. The cases "YES" and "NO" in S32 of FIG. 2 are examples of the "first case" and the "second case", respectively. Also, in a state where "0 (DHCP)" is stored in the method information storage area 22, the IP address that is stored in the DHCP IP address storage area 24 is an example of the "first IP address". Further, when the operation for selecting the OK button 82 is executed on the set screens 70*a* to 70*d*, the IP address that is displayed on the IP address display area 76 is an example of the "second IP address".

Also, the set screen 70*a* of FIG. 3A and the set screen 70*d* of FIG. 5 are examples of the "first screen" and the "second screen", respectively. The operation for selecting a button 74 on the set screen 70*a* of FIG. 3A and the operation for selecting the OK button 82 on the set screen 70*b* of FIG. 3B are examples of the "method change instruction". Further, the operation for selecting the button 74 on the set screen 70*a* of FIG. 3A is an example of the "display change instruction".

Modification to Exemplary Embodiments

Modified examples of the above-described exemplary embodiments will be described.

(1) In the above-described exemplary embodiments, in the case where a user operates the operation unit 12 of the printer 10, the printer 10 allows the user to change the registered contents of the NVRAM 20. However, in the case where the user operates the operation unit (not illustrated) of the PC 6, the printer 10 may allow the user to change the registered contents of the NVRAM 20. For example, in the case where the printer 10 has a web server function, the user may access the web server of the printer 10 using a web browser of the PC 6. In this case, the display control unit 58 may supply the set screen data for displaying the set screens 70*a* to 70*d* (see FIGS. 3A to 3C and 5) and warning screen data for displaying a warning screen (see FIG. 4) to the display unit of the PC 6. That is, the display control unit 58 may display the screen on the display unit 14 within the printer 10, or may display the screen on an external display unit of the printer 10.

(2) The first kind of setting method is not limited to the DHCP setting method, and may be BOOTP (Bootstrap Protocol) setting method. Also, the second kind of setting method is not limited to the static setting method, and may be RARP (Reverse Address Resolution Protocol) setting method.

(3) It is not necessary to install two storage areas of the DHCP IP address storage area 24 and the static IP address storage area 26, and a configuration in which only one storage area for storing the current IP address of the printer 10 is installed may be adopted.

(4) In the above-described exemplary embodiments, the change unit 54 determines whether the current IP address of the printer 10 has been changed to another IP address by comparing two IP addresses in S32 of FIG. 2. However, the change unit 54 may execute the process of determining whether the operation that is determined as "YES" in S18 has been executed instead of S32 (that is, it is not necessary for the change unit 54 to compare two IP addresses).

(5) In the case of "YES" in S32 in FIG. 2, the registration unit 52 may not execute the process in S34. Also, in the case of "YES" in S32 of FIG. 2, the registration unit 52 may execute the process in S34 and then execute the process in S36. That is, generally speaking, the registration unit may execute at least one of displaying a message indicating that the change from the first kind of setting method to the second kind of setting method is not recommended in the first case and changing the method information in the memory from the first kind of method information to the second kind of method information.

(6) In the above-described exemplary embodiments, the user's execution of the change operation of the contents of the respective set items (IP address setting method, IP address, and the like) is allowed in the inside such as one set screen 70a. Alternatively, by using a type of displaying screens in order for each set item so-called wizard type (dialogue type), for example, the user may be allowed to change the contents of the respective set items.

(7) In the second exemplary embodiment, in the case of "YES" in S14 of FIG. 2, the display control unit 58 may display a new set screen, from which the whole of the value string that indicates the current IP address of the printer 10 is erased, on the display unit 14.

(8) In the above-described exemplary embodiments, although an IP address of IPv4 (Internet Protocol version 4) is used, the techniques in the above-described exemplary embodiments can also be applied to a case where an IP address of IPv6 is used.

(9) In the above-described exemplary embodiments, the printer 10 is an example of a communication device. However, the communication device may be a server, a PC, a peripheral device of a PC (for example, a scanner, a phone, a copy machine, or a FAX), a PDA, a mobile phone, or the like.

Although exemplary embodiments of the present invention have been described in detail, they are merely exemplary, and do not limit the scope of the invention. The technique described in the claims includes diverse modifications and changes of the exemplary embodiments as described above.

Also, the technical elements described in the description and drawings show their technical utilities singly or by various kinds of combinations, and are not limited to the combination described in the claims at the time of filing. Also, the techniques exemplified in the description and drawings achieve plural purposes at the same time, and even the achievement of one purpose among the plural purposes has its technical utility.

What is claimed is:

1. A communication device comprising:
a memory; and
a processor, the processor configured to operate as:
 a registration unit configured to register method information indicating an IP address setting method of the communication device and an IP address of the communication device in the memory, wherein the method information is any one of plural kinds of method information including:
  a first kind of method information that indicates a first kind of setting method for setting a dynamic IP address automatically allocated to the communication device as the IP address of the communication device; and
  a second kind of method information that indicates a second kind of setting method for setting a static IP address manually designated by a user as the IP address of the communication device; and
 a communication execution unit configured to perform communication using the IP address registered in the memory,
 wherein the registration unit includes a change unit configured to change registered contents of the memory in accordance with an instruction of the user,
 wherein when the first kind of method information and a first IP address are registered in the memory, the change unit does not change the method information in the memory from the first kind of method information to the second kind of method information in a first case where a method change instruction for changing the first kind of setting method to the second kind of setting method is given by the user under a state where the first IP address has not been changed to another IP address, and
 wherein when the first kind of method information and the first IP address are registered in the memory, the change unit changes the method information in the memory from the first kind of method information to the second kind of method information in a second case where a method change instruction for changing the first kind of setting method to the second kind of setting method is given by the user under a state where the first IP address has been changed to another IP address.

2. The communication device according to claim 1, wherein the registration unit further includes a display control unit configured to display on a display unit a message indicating that the change from the first kind of setting method to the second kind of setting method is not recommended in the first case.

3. The communication device according to claim 1, wherein the change unit includes a determination unit configured to determine whether the first IP address registered in the memory coincides with a second IP address newly designated by the user, and
wherein if it is determined that the first IP address coincides with the second IP address, the change unit determines that the first IP address has not been changed to the another IP address.

4. The communication device according to claim 1, wherein the registration unit further includes a display control unit configured to display a screen for allowing the user to change the registered contents of the memory on the display unit, and
wherein the display control unit is configured to:
display a first screen for displaying the first kind of setting method and the first IP address on the display unit when the first kind of method information and the first IP address are registered in the memory; and
display a second screen for displaying the second kind of setting method, from which at least a portion of values in a value string that indicates the first IP address is erased, on the display unit when a display change instruction for changing the display for displaying the first kind of setting method to the display for displaying the second kind of setting method is given by the user through the first screen.

5. The communication device according to claim 4, wherein the second screen does not include a value for indicating a host portion of the first IP address, but the second screen includes a value for indicating a network address portion of the first IP address.

6. The communication device according to claim 4, wherein the display control unit is configured to display the second kind of setting method, from which a whole of the value string that indicates the first IP address is erased, on the display unit.

7. The communication device according to claim 1, wherein in the first kind of setting method, the first IP address is changed to another IP address.

8. A communication device comprising:
a memory; and
a processor, the processor configured to operate as:
- a registration unit configured to register method information indicating an IP address setting method of the communication device and an IP address of the communication device in the memory, wherein the method information is any one of plural kinds of method information including:
  - a first kind of method information that indicates a first kind of setting method for setting a dynamic IP address automatically allocated to the communication device as the IP address of the communication device; and
  - a second kind of method information that indicates a second kind of setting method for setting a static IP address manually designated by a user as the IP address of the communication device; and
- a communication execution unit configured to perform communication using the IP address registered in the memory, wherein the registration unit includes a change unit configured to change registered contents of the memory in accordance with an instruction of the user, wherein the registration unit includes a display control unit which, when the first kind of method information and a first IP address are registered in the memory, is configured to display on a display unit a message indicating that a change from the first kind of setting method to the second kind of setting method is not recommended in a first case where a method change instruction for changing the first kind of setting method to the second kind of setting method is given by the user under a state where the first IP address has not been changed to another IP address, and wherein when the first kind of method information and the first IP address are registered in the memory, the change unit changes the method information in the memory from the first kind of method information to the second kind of method information in a second case where a method change instruction for changing the first kind of setting method to the second kind of setting method is given by the user under a state where the first IP address has been changed to another IP address.

9. The communication device according to claim 8,
wherein the change unit includes a determination unit configured to determine whether the first IP address registered in the memory coincides with a second IP address newly designated by the user, and
wherein if it is determined that the first IP address coincides with the second IP address, the change unit determines that the first IP address has not been changed to the another IP address.

10. The communication device according to claim 8,
wherein the registration unit further includes a display control unit configured to display a screen for allowing the user to change the registered contents of the memory on the display unit, and
wherein the display control unit is configured to:
- display a first screen for displaying the first kind of setting method and the first IP address on the display unit when the first kind of method information and the first IP address are registered in the memory; and
- display a second screen for displaying the second kind of setting method, from which at least a portion of values in a value string that indicates the first IP address is erased, on the display unit when a display change instruction for changing the display for displaying the first kind of setting method to the display for displaying the second kind of setting method is given by the user through the first screen.

11. The communication device according to claim 10, wherein the second screen does not include a value for indicating a host portion of the first IP address, but the second screen includes a value for indicating a network address portion of the first IP address.

12. The communication device according to claim 10, wherein the display control unit is configured to display the second kind of setting method, from which a whole of the value string that indicates the first IP address is erased, on the display unit.

13. A non-transitory computer-readable medium having a computer program for a communication device including a memory stored thereon and readable by a computer installed in the communication device, the computer program, when executed by the computer, causes the computer to perform operations comprising:
- a registration operation of registering method information that indicates an IP address setting method of the communication device and an IP address of the communication device in the memory, wherein the method information is any one of plural kinds of method information including:
- a first kind of method information that indicates a first kind of setting method for setting a dynamic IP address automatically allocated to the communication device as the IP address of the communication device; and
- a second kind of method information that indicates a second kind of setting method for setting a static IP address manually designated by a user as the IP address of the communication device; and
- a communication execution operation of performing communication using the IP address registered in the memory;

wherein the registration operation includes a change operation of changing registered contents of the memory in accordance with a user instruction, wherein when the first kind of method information and a first IP address are registered in the memory, the change operation does not change the method information in the memory from the first kind of method information to the second kind of method information in a first case where a method change instruction for changing the first kind of setting method to the second kind of setting method is given by the user under a state where the first IP address has not been changed to another IP address, and wherein when the first kind of method information and the first IP address are registered in the memory, the change unit changes the method information in the memory from the first kind of method information to the second kind of method information in a second case where a method change instruction for changing the first kind of setting method to the second kind of setting method is given by the user under a state where the first IP address has been changed to another IP address.

14. A non-transitory computer-readable medium having a computer program for a communication device including a memory stored thereon and readable by a computer installed in the communication device, the computer program, when executed by the computer, causes the computer to perform operations comprising:
- a registration operation of registering method information indicating an IP address setting method of the communication device and an IP address of the communication device in the memory, wherein the method information is any one of plural kinds of method information including:
a first kind of method information that indicates a first kind of setting method for setting a dynamic IP address automatically allocated to the communication device as the IP address of the communication device; and
a second kind of method information that indicates a second kind of setting method for setting a static IP address manually designated by a user as the IP address of the communication device; and
a communication execution operation of performing communication using the IP address registered in the memory,
wherein the registration operation includes a change operation of changing registered contents of the memory in accordance with an instruction of the user,
wherein the registration operation includes a display control operation of, when the first kind of method information and a first IP address are registered in the memory, displaying on a display unit a message indicating that a change from the first kind of setting method to the second kind of setting method is not recommended in a first case where a method change instruction for changing the first kind of setting method to the second kind of setting method is given by the user under a state where the first IP address has not been changed to another IP address, and
wherein when the first kind of method information and the first IP address are registered in the memory, the change unit changes the method information in the memory from the first kind of method information to the second kind of method information in a second case where a method change instruction for changing the first kind of setting method to the second kind of setting method is given by the user under a state where the first IP address has been changed to another IP address.

* * * * *